US010756520B2

(12) United States Patent
Horng et al.

(10) Patent No.: US 10,756,520 B2
(45) Date of Patent: Aug. 25, 2020

(54) SLEEVE UNIT FOR A MOTOR OF A CEILING FAN

(71) Applicant: Sunonwealth Electric Machine Industry Co., Ltd., Kaohsiung (TW)

(72) Inventors: Alex Horng, Kaohsiung (TW);
Tso-Kuo Yin, Kaohsiung (TW);
Kun-Ta Yang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 144 days.

(21) Appl. No.: 16/149,302

(22) Filed: Oct. 2, 2018

(65) Prior Publication Data

US 2019/0252867 A1  Aug. 15, 2019

(30) Foreign Application Priority Data

Feb. 9, 2018  (TW) .............................. 107104776 A (51) Int. Cl.
| | |
|---|---|
| *H02K 7/00* | (2006.01) |
| *H02G 3/04* | (2006.01) |
| *F04D 25/08* | (2006.01) |
| *F04D 25/06* | (2006.01) |
| *H02K 3/32* | (2006.01) |
| *H02K 5/22* | (2006.01) |

(52) U.S. Cl.
CPC ......... *H02G 3/045* (2013.01); *F04D 25/0693* (2013.01); *F04D 25/088* (2013.01); *H02G 3/0462* (2013.01); *H02K 3/32* (2013.01); *H02K 5/22* (2013.01)

(58) Field of Classification Search
CPC .......................... H02G 3/045; F04D 25/0693
USPC ........................................................ 310/67 R
See application file for complete search history.

(56) References Cited

U.S. PATENT DOCUMENTS

| | | | | |
|---|---|---|---|---|
| 2,772,046 A | * | 11/1956 | Shomphe ............ | F04D 25/0613 417/354 |
| 3,772,544 A | * | 11/1973 | Wrobel .................... | H02K 3/50 310/71 |
| 3,899,702 A | * | 8/1975 | Hanna ...................... | H02K 1/26 310/67 R |
| 4,329,606 A | * | 5/1982 | Montagu .................. | H02K 9/22 310/112 |
| 7,166,946 B2 | * | 1/2007 | Gauthier .............. | H02K 7/1016 310/67 R |
| 7,567,001 B2 | * | 7/2009 | Kasai .................... | F04D 29/624 310/58 |
| 8,147,182 B2 | | 4/2012 | Aynsley et al. | |
| 8,876,468 B2 | | 11/2014 | Aynsley et al. | |

(Continued)

*Primary Examiner* — Alexander Talpalatski
(74) *Attorney, Agent, or Firm* — Alan D. Kamrath; Mayer & Williams PC (57) ABSTRACT

A sleeve unit for a motor of a ceiling fan includes a tubular member and a wire isolation member. The tubular member has a lateral slot extending through the tubular member from an inner periphery to an outer periphery of the tubular member. The lateral slot extends from a first axial end face towards a second axial end face of the tubular member along an axis of the tubular member. The wire isolation member includes an isolation plate unit delimiting a wire channel. The wire channel is located in the lateral slot. The isolation plate unit includes a stopper plate which is located in the lateral slot but does not come into a space delimited by the inner periphery of the tubular member.

12 Claims, 6 Drawing Sheets

(56) References Cited

U.S. PATENT DOCUMENTS

2016/0138609 A1* 5/2016 Lin ................... F04D 25/0693
                                                                          415/213.1
2018/0274546 A1* 9/2018 Horng ................. H02K 21/22

\* cited by examiner

SLEEVE UNIT FOR A MOTOR OF A CEILING FAN

CROSS REFERENCE TO RELATED APPLICATION

The application claims the benefit of Taiwan application serial No. 107104776, filed on Feb. 9, 2018, and the entire contents of which are incorporated herein by reference.

BACKGROUND OF THE INVENTION

1. Field of the Invention

The present invention generally relates to a sleeve unit and, more particularly, to a sleeve unit for a motor of a ceiling fan.

2. Description of the Related Art

Figure 1:
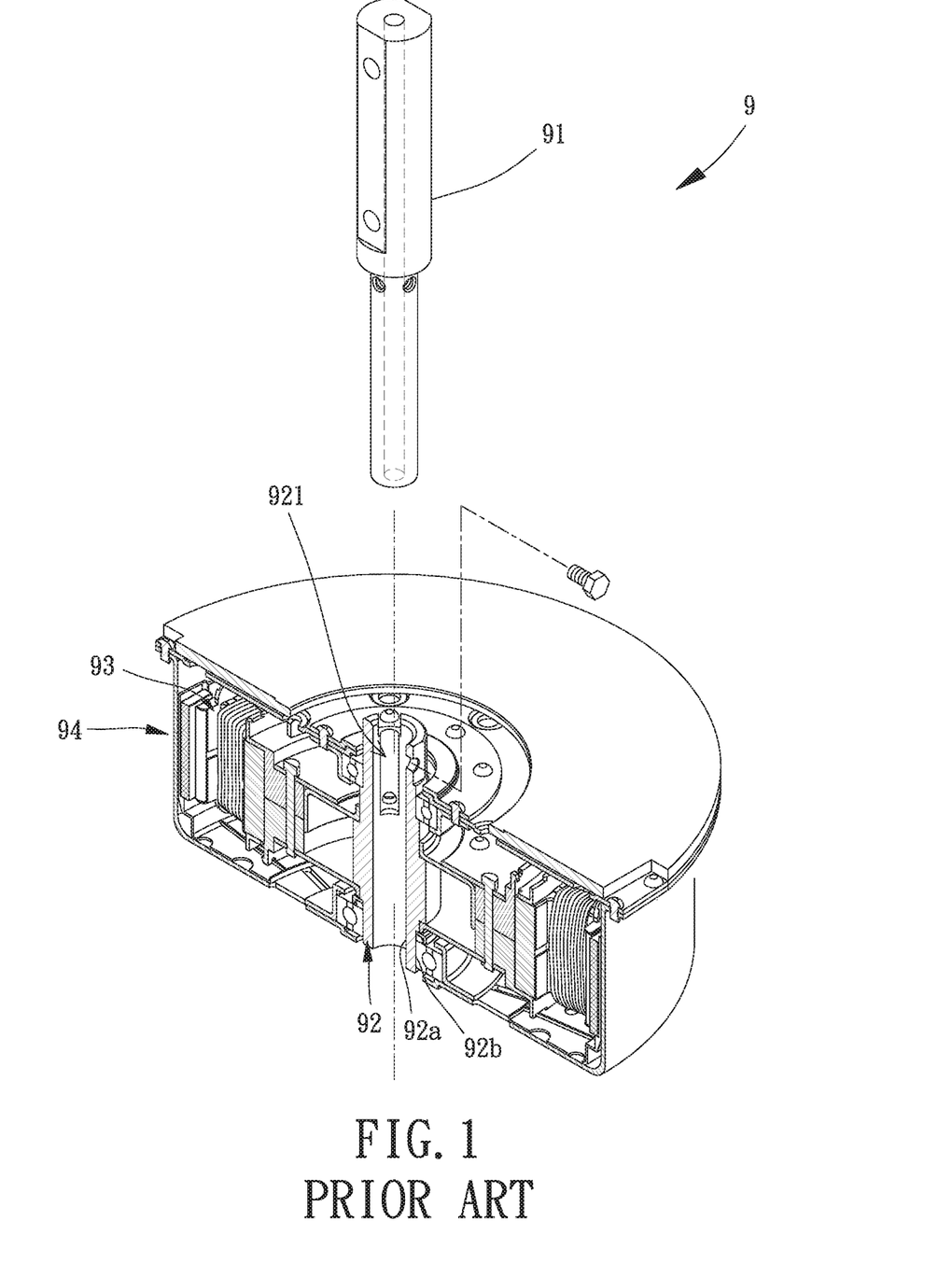
FIG. 1 is an unassembled view of a motor of a conventional ceiling fan.

A motor 9 of a conventional ceiling fan includes an axle 91, a sleeve 92, a stator unit 93 and a rotor unit 94. The axle 91 is the component of the motor 9 that is fixed to the ceiling. The axle 91 is detachably attached to the sleeve 92. The sleeve 92 includes a wire channel 921 extending through the sleeve 92 from an inner periphery 92a to the outer periphery 92b thereof. The stator unit 93 is coupled with the outer periphery 92b of the sleeve 92. The rotor unit 94 is rotatably coupled with the outer periphery 92b of the sleeve 92. During the assembly, the sleeve 92, the stator unit 93 and the rotor unit 94 are assembled to each other first. The sleeve 92 is coupled with the axle 91 later when the motor 9 is to be used.

Since the motor of the ceiling fan usually requires power to rotate the rotor unit 94, the stator unit 93 needs to be connected to an external power source. Therefore, the stator unit 93 includes a wire unit (such as a power cable) extending out of the ceiling fan via the wire channel 921 of the sleeve 92 and connected to the external power source.

In the structure, the wire unit extending inside the wire channel 921 is neither fixed in place nor tightened up. Thus, the wire unit is loosened and can intrude into the space of the axle 91. As a result, during the assembly of the sleeve 92 and the axle 91, the wire unit tends to subject to pulling or squeezing by the axle 91 and thereby causing poor contact or breaking of the wire unit of the stator unit 93. This can create damage to the motor 9 and leads to malfunction of the motor 9, significantly shortening the service life of the motor 9.

In light of the above problem, it is necessary to improve the motor of the conventional ceiling fan.

SUMMARY OF THE INVENTION

It is therefore the objective of this invention to provide a sleeve unit for the motor of the ceiling fan which enables isolation between the space of the axle and the wire channel, thereby preventing the axle from pulling or squeezing the wire unit during the assembly of the axle and improving the convenience in assembly of the motor of the ceiling fan.

In an aspect, a sleeve unit for a motor of a ceiling fan includes a tubular member and a wire isolation member. The tubular member has a lateral slot extending through the tubular member from an inner periphery to an outer periphery of the tubular member. The lateral slot extends from a first axial end face towards a second axial end face of the tubular member along an axis of the tubular member. The wire isolation member includes an isolation plate unit delimiting a wire channel. The wire channel is located in the lateral slot. The isolation plate unit includes a stopper plate which is located in the lateral slot but does not come into a space delimited by the inner periphery of the tubular member.

Based on this, with the sleeve unit for the motor of the ceiling fan according to the embodiment of the invention, the wire channel is located in the lateral slot and the stopper plate of the isolation plate unit is located in the wire channel but does not come into the space delimited by the inner periphery of the tubular member. Therefore, an axle can extend through the tubular member while the space of the axle is isolated from the wire channel of the wire isolation member. A wire unit of a stator unit can extend out of the ceiling fan through the wire channel of the wire isolation member in order to be electrically connected to an external power source. This ensures that the wire unit of the stator unit is not damaged during the assembly of the ceiling fan, avoiding poor contact or breaking of the wire unit. Advantageously, the convenience in assembly of the motor of the ceiling fan is improved and the lifespan of the ceiling fan is prolonged.

In an example, the tubular member includes a tube body and a positioning sleeve coupled with the tube body, and the lateral slot extends through the tube body and the positioning sleeve. Thus, the structure is simple and the manufacturing and assembly processes are convenient, thereby reducing the manufacturing cost and improving the convenience in assembly.

In the example, the tube body and the positioning sleeve are integrally formed with each other. Thus, the tubular member has a higher structure strength.

In the example, the sleeve unit for the motor of the ceiling fan further includes an outer sleeve coupled with the outer periphery of the tubular member. The outer sleeve includes an isolation portion delimiting a guiding slot. The guiding slot is located in the lateral slot. The guiding slot and the wire channel align and intercommunicate with each other. Advantageously, the wire unit of the stator unit will not make contact with the tubular member when pulled out of the ceiling fan through the wire channel.

In the example, the outer sleeve is made of insulating material. Thus, an improved insulating function can be provided.

In the example, the positioning sleeve includes a stator-coupling portion, and the outer sleeve is coupled with the stator-coupling portion. Thus, the convenience in assembly is improved.

In the example, the wire isolation member includes a plurality of tabs coupled with the isolation plate unit and arranged at two sides of the wire channel, and each of the plurality of tabs abuts the outer periphery of the tubular member. Thus, the wire isolation member can be fixed to the tubular member by the plurality of tabs.

In the example, a length of the isolation portion from an innermost side to an outermost side of the isolation portion is smaller than a length from an outer periphery of the tubular body to an outer periphery of the positioning sleeve. Thus, the wire channel will have sufficient space for receiving the wire unit.

In the example, the lateral slot extends from the first axial end face to the second axial end face of the tubular member along the axis of the tubular member. Thus, the lateral slot will have sufficient space for receiving the wire unit.

In the example, the wire isolation member is made of insulating material. Thus, an improved insulating function can be provided.

In the example, the wire isolation member includes two side plates that do not protrude beyond the outer periphery of the tubular member. Thus, the convenience in assembly is improved.

In the example, the two side plates of the wire isolation member respectively abut two inner walls of the lateral slot delimiting the lateral slot. Thus, the convenience in assembly is improved.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom", "front", "rear", "axial", "radial", "longitudinal", "transverse", "length", "width", "height" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
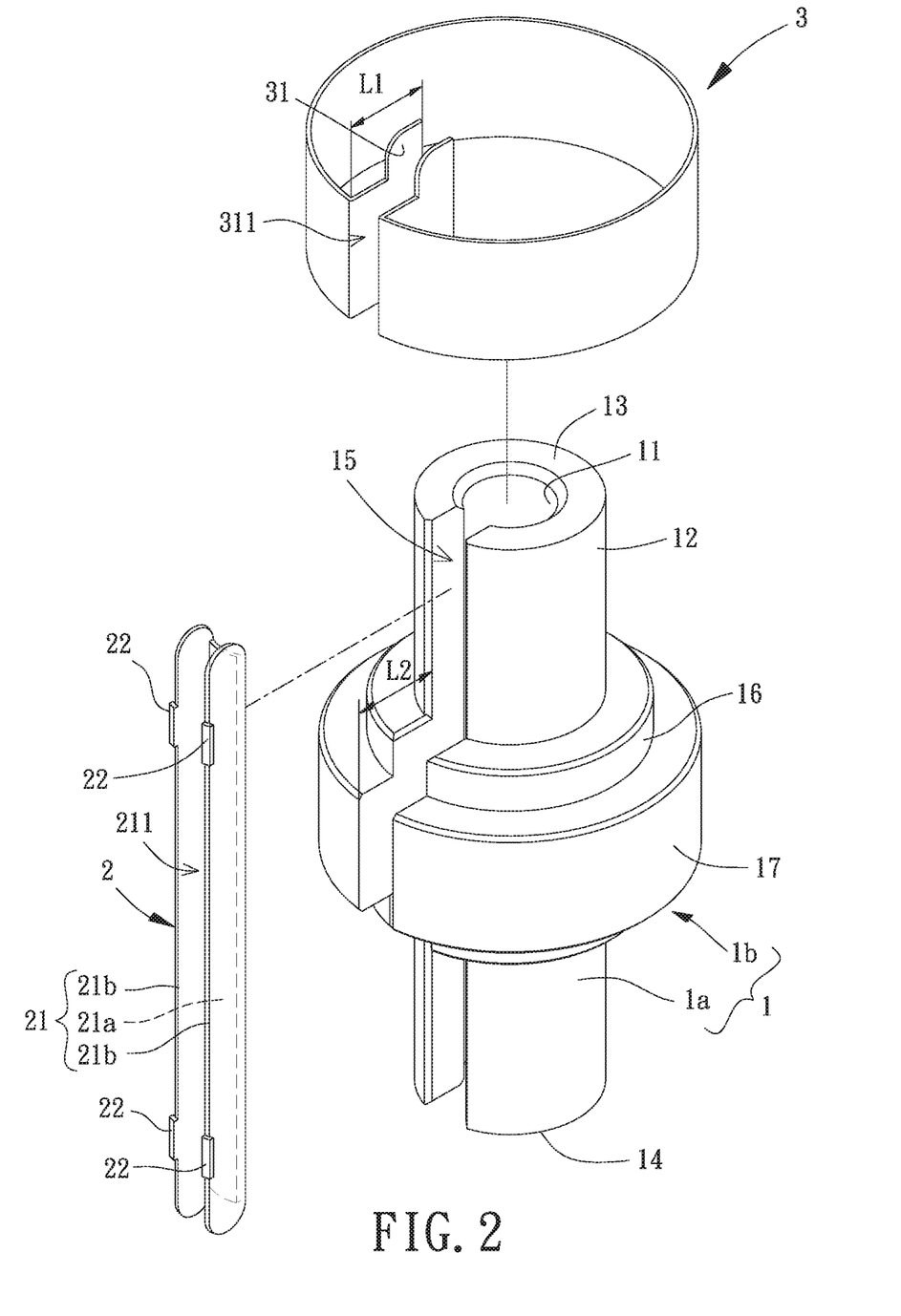
FIG. 2 is an exploded view of a sleeve unit for a motor of a ceiling fan according to an embodiment of the invention.

FIG. 2 shows a sleeve unit for a motor of a ceiling fan according to an embodiment of the invention. The sleeve unit includes a tubular member 1 and a wire isolation member 2 mounted to the tubular member 1.

The tubular member 1 includes an inner periphery 11, an outer periphery 12, a first axial end face 13 and a second axial end face 14. The first axial end face 13 and the second axial end face 14 are spaced from each other along an axis of the tubular member 1. The tubular member 1 further includes a lateral slot 15 extending from the inner periphery 11 to the outer periphery 12 radially, and from the first axial end face 13 towards the second axial end face 14 axially. In a preferred case, the lateral slot 15 axially extends from the first axial end face 13 to the second axial end face 14.

Figure 3:
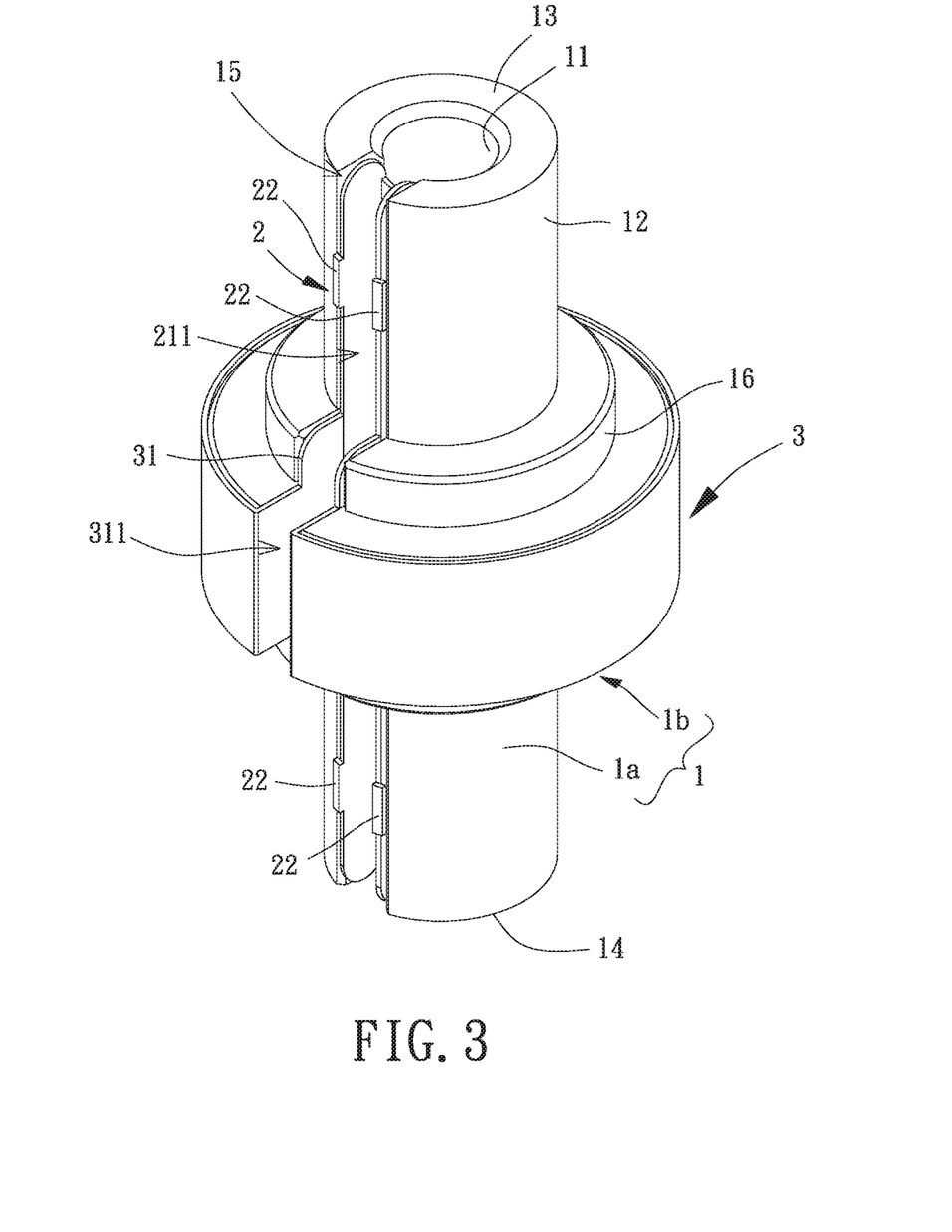
FIG. 3 is an assembled view of the sleeve unit for the motor of the ceiling fan according to the embodiment of the invention.

Referring to FIGS. 2 and 3, the tubular member 1 can be formed integrally or by injection molding, or can include a tube and a sleeve that are press fit with each other. Specifically, the tubular member 1 may include a tube body 1a and a positioning sleeve 1b. The positioning sleeve 1b is preferably mounted around the outer periphery of the tube body 1a, or is integrally formed with the tube body 1a. In this embodiment, the tube body 1a and the positioning sleeve 1b are integrally connected to each other. In this arrangement, the tubular member 1 can have a higher structural strength. In addition, the lateral slot 15 extends through the tube body 1a and the positioning sleeve 1b.

Figure 4:
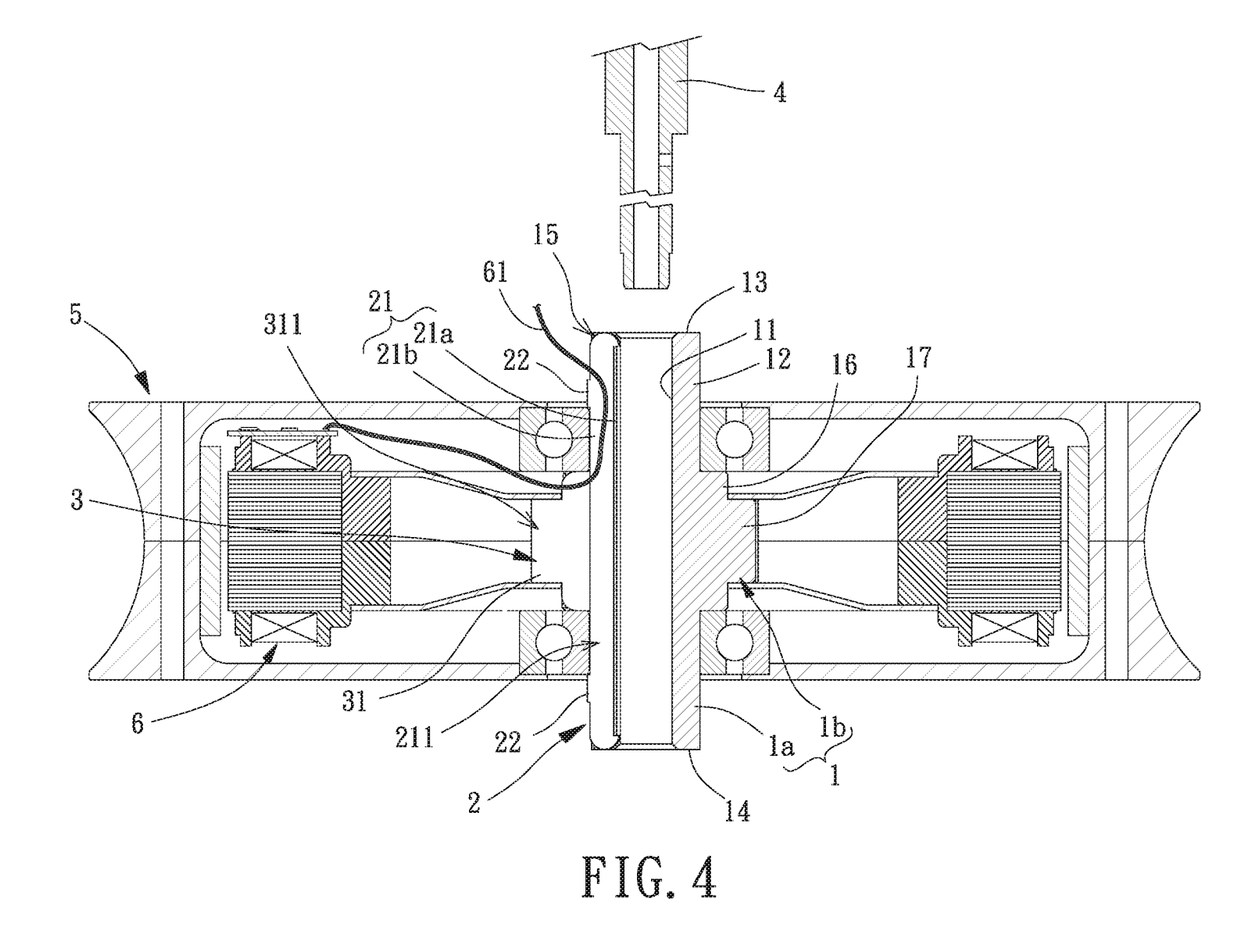
FIG. 4 is a cross sectional view of the motor of the ceiling fan before the axle is assembled according to the embodiment of the invention.

Referring to FIGS. 3 and 4, it is noted that an axle 4 can extend through the tube body 1a. The axle 4 is fixed to a predetermined location such as the ceiling. Besides, the positioning sleeve 1b may include a rotor-coupling portion 16 and a stator-coupling portion 17 with which a rotor unit 5 and a stator unit 6 are respectively coupled. In this arrangement, the smoothness of the stator unit 6 driving the rotor unit 5 can be improved. In this embodiment, the rotor-coupling portion 16 may be an annular protrusion radially protruding beyond the outer periphery 12 of the tubular member 1 outwardly. The stator-coupling portion 17 may be an annular protrusion radially protruding beyond the rotor-coupling portion 16 outwardly.

Referring to FIGS. 2 and 3, the wire isolation member 2 is mounted to the tubular member 1 and is preferably made of insulating material. The wire isolation member 2 includes an isolation plate unit 21. The isolation plate unit 21 includes a wire channel 211 located in the lateral slot 15 of the tubular member 1. The isolation plate unit 21 further includes a stopper plate 21a and two side plates 21b coupled with the stopper plate 21a. The stopper plate 21a of the isolation plate unit 21 is located in the wire channel 211 but does not come into the space of the axle 4 delimited by the inner periphery 11 of the tubular member 1. The two side plates 21b preferably do not protrude beyond the outer periphery 12 of the tubular member 1 and respectively abut two inner walls of the tubular member 1 delimiting the lateral slot 15. The wire isolation member 2 may further include a plurality of tabs 22 coupled with the two side plates 21b and arranged at two sides of the wire channel 211. Each of the plurality of tabs 22 abuts the outer periphery 12 of the tubular member 1 to thereby fix the wire isolation member 2 to the tubular member 1. The plurality of tabs 22 is coupled to the outer periphery 12 of the tubular member 1 by screwing, fastening or tenoning, but is not limited thereto.

The sleeve unit for the motor of the ceiling fan according to the embodiment of the invention may further include an outer sleeve 3. The outer sleeve 3 is preferably fit around the stator-coupling portion 17. The outer sleeve 3 may include an isolation portion 31 and is preferably made of insulating material. A length L1 of the isolation portion 31 from the innermost side to the outermost side thereof is preferably smaller than a length L2 from an outer periphery of the tubular body 1a to an outer periphery of the positioning sleeve 1b, such that the outer sleeve 3 does not occupy too much space out of the wire channel 211. Thus, the wire channel 211 can have sufficient space for receiving a wire unit 61 that is shown in FIG. 4. The isolation portion 31 includes a guiding slot 311 located in the lateral slot 15. The guiding slot 311 and the wire channel 211 preferably intercommunicate with each other.

Referring to FIGS. 3 and 4, since the motor of the ceiling fan requires power to operate the rotor unit 5, the stator unit 6 must receive an external power source. The stator unit 6 includes a wire unit 61 (such as a power cable) extending to the ceiling through the wire channel 211 of the wire isolation member 2 in order to be electrically connected to the external power source. Based on this, the external power source can supply power to the stator unit 6 via the wire unit 61.

Referring to FIGS. 3 and 4, based on the above structure, during the use of the motor of the ceiling fan according to the embodiment, the wire channel 211 of the wire isolation member 2 is located in the lateral slot 15 of the tubular member 1. In this arrangement, the stopper plate 21a of the isolation plate unit 21 is located in the wire channel 211 but does not come into the space of the axle 4 delimited by the inner periphery 11 of the tubular member 1. In this arrangement, the wire channel 211 can provide a space for the wire unit 61 of the stator unit 6.

Figure 5:
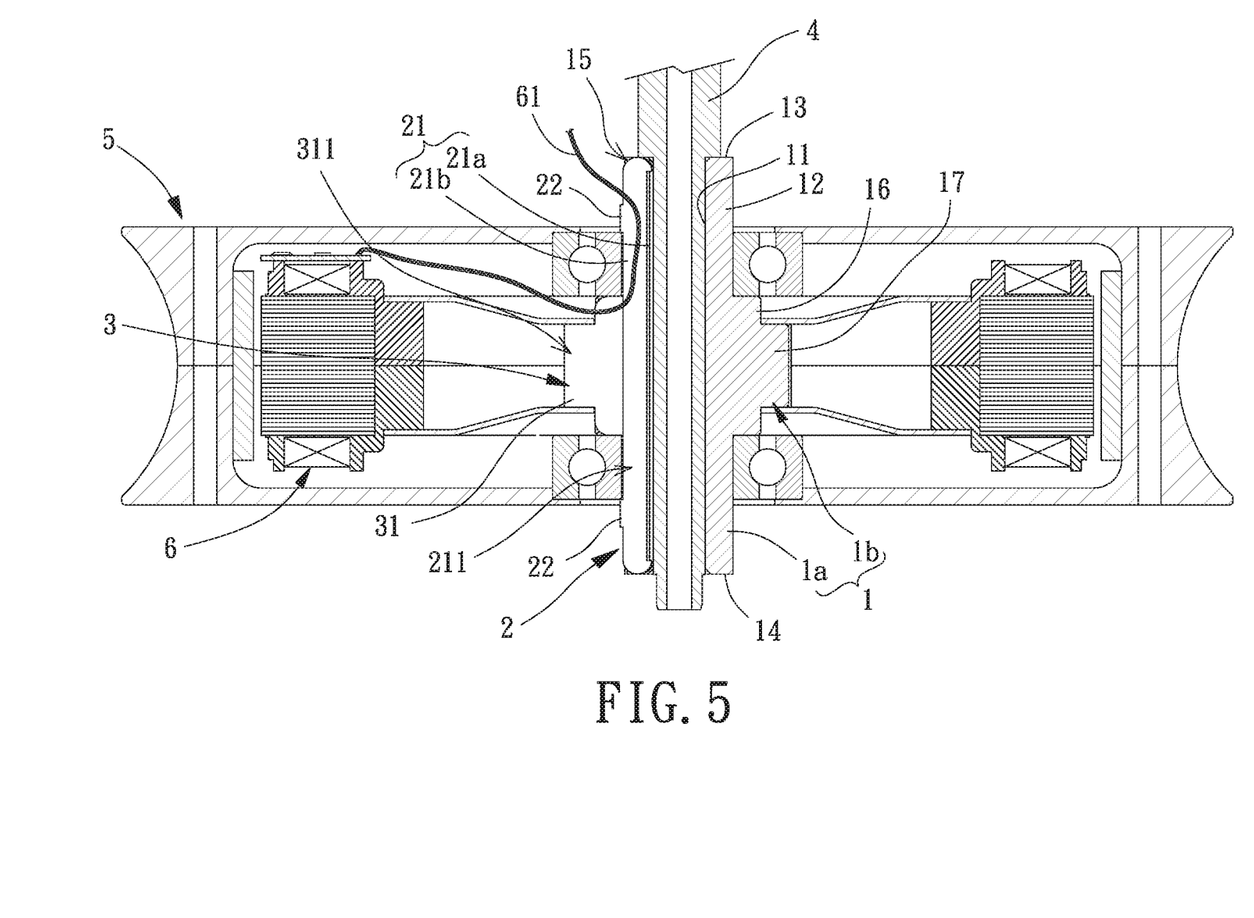
FIG. 5 is a cross sectional view of the motor of the ceiling fan after the axle is assembled according to the embodiment of the invention.

Referring to FIGS. 4 and 5, the rotor unit 5 can be coupled with the rotor-coupling portion 16 of the tubular member 1, and the stator unit 6 can be coupled with the stator-coupling portion 17 of the tubular member 1. Furthermore, the axle 4 can extend through the tube body 1a of the tubular member 1. The rotor unit 5 can be mounted around the axle 4 and can be driven to rotate relatively to the axle 4. The wire unit 61 of the stator unit 6 extends out of the sleeve unit of the motor of the ceiling fan from the wire channel 211 of the wire isolation member 2 while the stopper plate 21a of the isolation plate unit 21 is located in the wire channel 211 but does not come into the space of the axle 4 delimited by the inner periphery 11 of the tubular member 1. In this arrangement, the space of the axle 4 can be isolated from the wire channel 211 to prevent the axle 4 from pulling or squeezing the wire unit 61 during the assembly of the axle 4 which adversely leads to poor contact or breaking of the wire unit 61.

Figure 6:
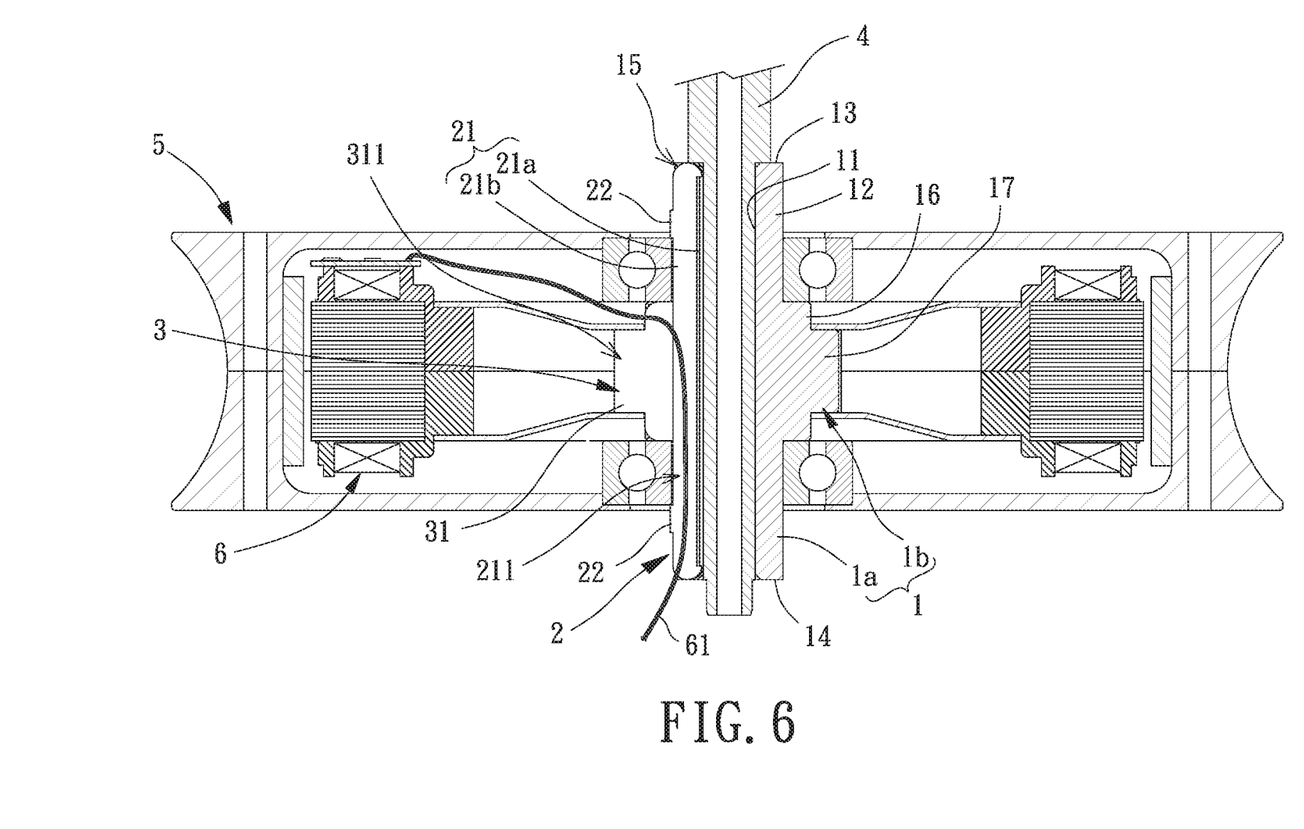
FIG. 6 is a cross sectional view of the motor of the ceiling fan where the wire unit extends downwardly along the wire channel.

It is noted that the wire unit 61 of the stator unit 6 can extend upwardly along the wire channel 211 of the wire isolation member 2 as shown in FIG. 5, or can extend downwardly along the wire channel 211 of the wire isolation member 2 as shown in FIG. 6. This provides a flexible use of the sleeve unit and improves the convenience in use thereof.

In conclusion, the sleeve unit for the motor of the ceiling fan according to the embodiment of the invention provides an isolation mechanism between the space of the axle and the wire channel of the wire isolation member by arranging the wire channel in the lateral slot in which the stopper plate of the isolation plate unit is located in the wire channel but does not come into the space of the axle delimited by the inner periphery of the tubular member. Based on this, the wire unit of the stator unit can extend out of the motor through the wire channel of the wire isolation member in order to be electrically connected to the external power source. This ensures that the wire unit of the stator unit is not damaged during the assembly of the ceiling fan, avoiding poor contact or breaking of the wire unit. Advantageously, the convenience in assembly of the motor of the ceiling fan is improved and the lifespan of the ceiling fan is prolonged.

Although the invention has been described in detail with reference to its presently preferable embodiments, it will be understood by one of ordinary skill in the art that various modifications can be made without departing from the spirit and the scope of the invention, as set forth in the appended claims

What is claimed is:

1. A sleeve unit for a motor of a ceiling fan, comprising:
   a tubular member having a lateral slot extending through the tubular member from an inner periphery to an outer periphery of the tubular member, wherein the lateral slot extends from a first axial end face towards a second axial end face of the tubular member along an axis of the tubular member; and
   a wire isolation member including an isolation plate unit delimiting a wire channel, wherein the wire channel is located in the lateral slot, and wherein the isolation plate unit includes a stopper plate which is located in the lateral slot but does not come into a space delimited by the inner periphery of the tubular member.

2. The sleeve unit for the motor of the ceiling fan as claimed in claim 1, wherein the tubular member includes a tube body and a positioning sleeve coupled with the tube body, and wherein the lateral slot extends through the tube body and the positioning sleeve.

3. The sleeve unit for the motor of the ceiling fan as claimed in claim 2, wherein the tube body and the positioning sleeve are integrally formed with each other.

4. The sleeve unit for the motor of the ceiling fan as claimed in claim 2, further comprising an outer sleeve coupled with the outer periphery of the tubular member, wherein the outer sleeve includes an isolation portion delimiting a guiding slot, wherein the guiding slot is located in the lateral slot, and wherein the guiding slot and the wire channel align and intercommunicate with each other.

5. The sleeve unit for the motor of the ceiling fan as claimed in claim 4, wherein the outer sleeve is made of insulating material.

6. The sleeve unit for the motor of the ceiling fan as claimed in claim 4, wherein the positioning sleeve includes a stator-coupling portion, and wherein the outer sleeve is coupled with the stator-coupling portion.

7. The sleeve unit for the motor of the ceiling fan as claimed in claim 1, wherein the wire isolation member includes a plurality of tabs coupled with the isolation plate unit and arranged at two sides of the wire channel, and wherein each of the plurality of tabs abuts the outer periphery of the tubular member.

8. The sleeve unit for the motor of the ceiling fan as claimed in claim 4, wherein a length of the isolation portion from an innermost side to an outermost side of the isolation portion is smaller than a length from an outer periphery of the tubular body to an outer periphery of the positioning sleeve.

9. The sleeve unit for the motor of the ceiling fan as claimed in claim 1, wherein the lateral slot extends from the first axial end face to the second axial end face of the tubular member along the axis of the tubular member.

10. The sleeve unit for the motor of the ceiling fan as claimed in claim 1, wherein the wire isolation member is made of insulating material.

11. The sleeve unit for the motor of the ceiling fan as claimed in claim 1, wherein the wire isolation member includes two side plates that do not protrude beyond the outer periphery of the tubular member.

12. The sleeve unit for the motor of the ceiling fan as claimed in claim 11, wherein the two side plates of the wire isolation member respectively abut two inner walls of the lateral slot delimiting the lateral slot.

* * * * *